United States Patent
Bowman et al.

(10) Patent No.: US 9,055,719 B2
(45) Date of Patent: Jun. 16, 2015

(54) METHOD AND APPARATUS FOR RIDE CONTROL ACTIVATION

(71) Applicant: Deere & Company, Moline, IL (US)

(72) Inventors: Jason Bowman, Dubuque, IA (US); Thomas Waller, Dubuque, IA (US); Thomas Chin, Dubuque, IA (US); Jed Polzin, Platteville, WI (US)

(73) Assignee: DEERE & COMPANY, Moline, IL (US)

(*) Notice: Subject to any disclaimer, the term of this patent is extended or adjusted under 35 U.S.C. 154(b) by 66 days.

(21) Appl. No.: 13/706,550

(22) Filed: Dec. 6, 2012

(65) Prior Publication Data

US 2014/0158452 A1    Jun. 12, 2014

(51) Int. Cl.
| | | |
|---|---|---|
| *B60K 26/00* | (2006.01) | |
| *E02F 9/20* | (2006.01) | |
| *A01G 23/00* | (2006.01) | |
| *E02F 3/34* | (2006.01) | |
| *E02F 9/26* | (2006.01) | |
| *B60K 26/02* | (2006.01) | |

(52) U.S. Cl.
CPC ............ *A01G 23/006* (2013.01); *E02F 3/3414* (2013.01); *E02F 9/2004* (2013.01); *E02F 9/26* (2013.01); *B60K 2026/029* (2013.01); *B60K 2026/027* (2013.01)

(58) Field of Classification Search
CPC ......... E02F 9/2004; E02F 9/2257; E02F 9/22; E02F 9/2029; E02F 9/2025; B62D 1/12; B62D 1/22; B60G 17/016; B60G 17/056; B60G 17/018; B60G 17/005; B60G 2800/914; B60G 2800/912; B60G 2800/012; B60G 2800/014; B60G 2800/164; B60G 2204/46; B60G 2600/02; B60G 2600/20; B60G 2600/204; B60G 2300/09; B60G 2400/1061; B66F 9/065; B66F 9/07586; B66F 2400/60
USPC .................. 180/333, 324; 280/5.519; 74/491, 74/471 XY
See application file for complete search history.

(56) References Cited

U.S. PATENT DOCUMENTS

| | | | | |
|---|---|---|---|---|
| 4,552,238 | A * | 11/1985 | Joyce, Jr. ....................... | 180/420 |
| 4,734,006 | A * | 3/1988 | Krob et al. .................... | 414/719 |
| 6,633,804 | B2 * | 10/2003 | Dix et al. ........................ | 701/50 |
| 6,718,244 | B2 * | 4/2004 | Lin et al. ......................... | 701/50 |
| 7,032,703 | B2 * | 4/2006 | Wulfert et al. ................ | 180/329 |
| 7,119,290 | B2 * | 10/2006 | Kim .............................. | 200/5 R |
| 7,334,658 | B2 * | 2/2008 | Berg et al. ..................... | 180/333 |
| 7,458,439 | B2 * | 12/2008 | Catton et al. .................. | 180/334 |
| 7,484,587 | B2 * | 2/2009 | Portscheller et al. ......... | 180/329 |
| 7,681,686 | B1 * | 3/2010 | Klas et al. ..................... | 180/331 |
| 2002/0001516 | A1 * | 1/2002 | Cook et al. .................... | 414/685 |
| 2003/0125856 | A1 * | 7/2003 | Lin et al. ......................... | 701/37 |
| 2005/0279561 | A1 * | 12/2005 | Shearer et al. ................ | 180/333 |
| 2005/0279861 | A1 * | 12/2005 | Bhatia .......................... | 239/345 |
| 2006/0101815 | A1 * | 5/2006 | Kobayashi et al. ............ | 60/413 |
| 2006/0137931 | A1 * | 6/2006 | Berg et al. ..................... | 180/333 |

(Continued)

*Primary Examiner* — Ruth Ilan

(57) ABSTRACT

A construction machine is provided. The construction machine includes a chassis and a ground engaging member (such as a wheel or a track) operable to support and move the chassis over ground. The construction machine further includes a work implement (such as a bucket) coupled to the chassis; a cab mounted on said chassis and having a user seat, and a first controller (such as a joystick) accessible to a user seated in the user seat. The joystick controls at least one of moving the work machine over ground and movement of the bucket. The joystick has a first actuator (such as a trigger button) that is operable to selectively engage ride control functionality.

21 Claims, 4 Drawing Sheets

(56) References Cited

U.S. PATENT DOCUMENTS

| | | | |
|---|---|---|---|
| 2006/0179831 A1* | 8/2006 | Anderson et al. | 60/468 |
| 2006/0266027 A1* | 11/2006 | Ma et al. | 60/469 |
| 2007/0056277 A1* | 3/2007 | Mizoguchi et al. | 60/413 |
| 2009/0027045 A1* | 1/2009 | Islam et al. | 324/207.13 |
| 2009/0223735 A1* | 9/2009 | Ruhter et al. | 180/333 |
| 2010/0024411 A1* | 2/2010 | Payne et al. | 60/426 |
| 2010/0108336 A1* | 5/2010 | Thomson et al. | 172/795 |
| 2010/0250066 A1* | 9/2010 | Eckstein et al. | 701/41 |
| 2013/0299266 A1* | 11/2013 | Ho et al. | 180/271 |
| 2013/0345936 A1* | 12/2013 | Callaway et al. | 701/50 |

\* cited by examiner

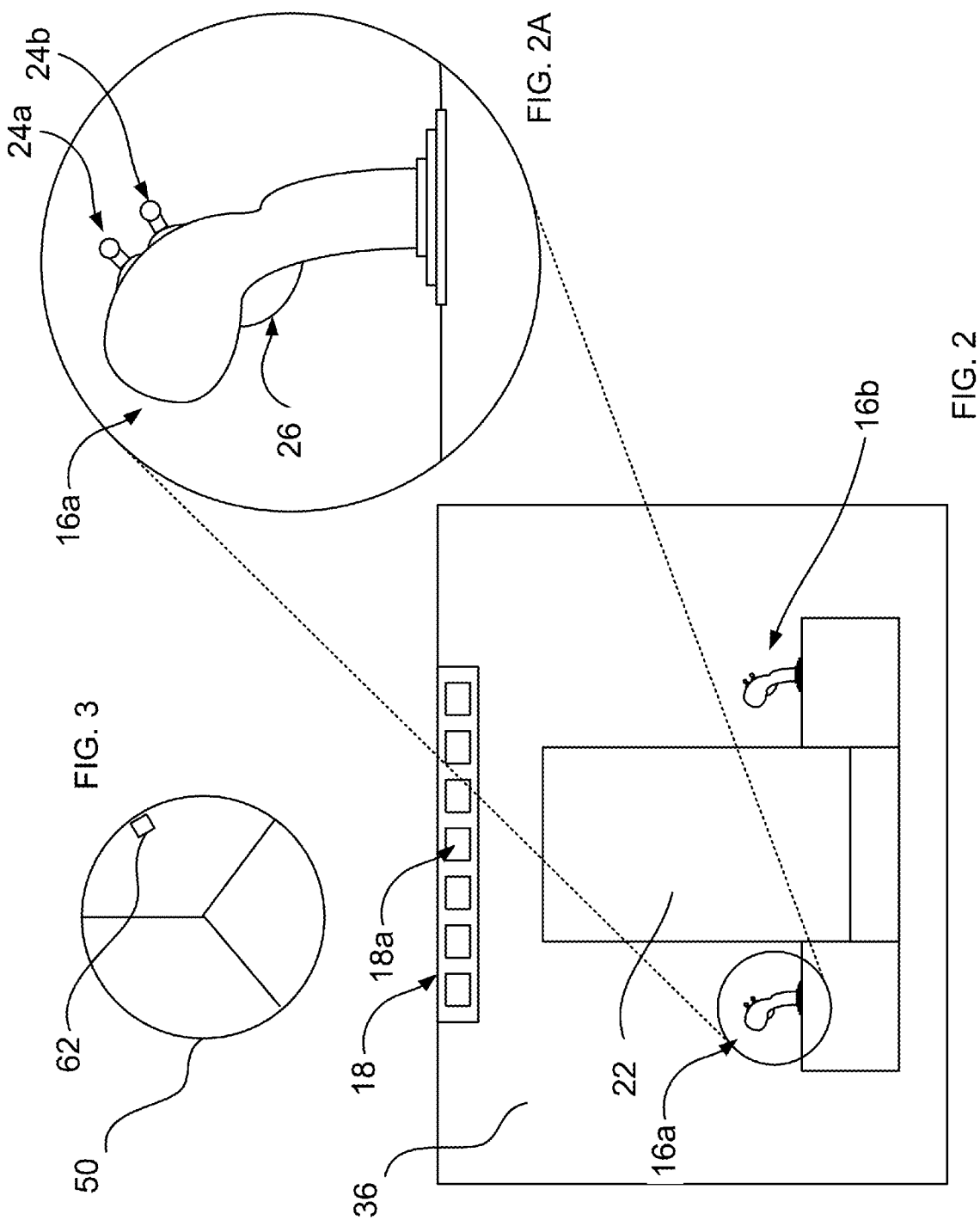

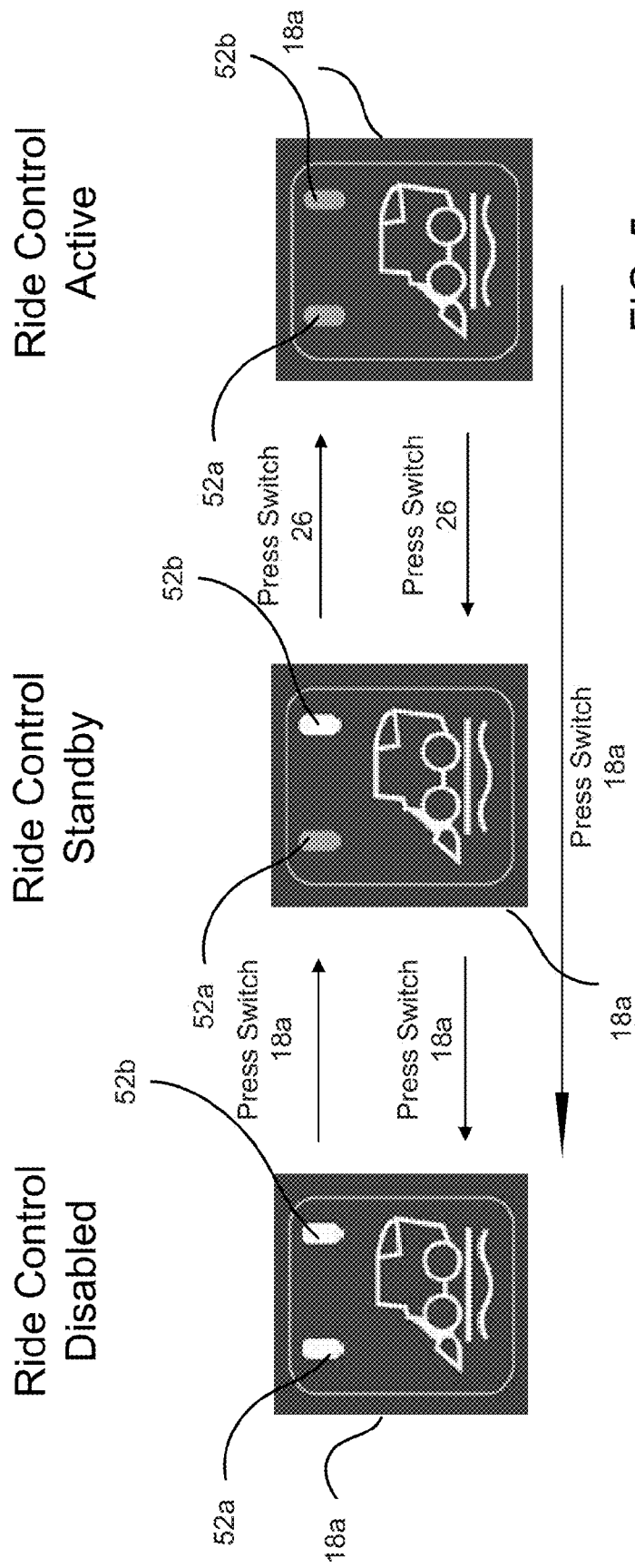

100
METHOD AND APPARATUS FOR RIDE CONTROL ACTIVATION

FIELD

The present invention relates to construction machines, such as skid steers and compact loaders, and, more particularly, to mechanisms for engaging and disengaging of ride control functionality on such construction machines.

BACKGROUND

Construction machines or vehicles, such as skid steers and compact loaders, generally include a chassis and a ground-engaging traction device coupled to the chassis and adapted to move the chassis along the ground. The chassis supports a cab in which the operator sits and operates the construction machine. A construction implement, such as a bucket, forklift, pile driver or grapple, is movably coupled to the chassis by lift arms, and is operated by the operator using controls located in the cab. Such construction machines often hold significant mass at the end of the lift arms. Such mass shifts the center of mass of the construction machine. Forces applied to mass at the end of the arms can cause instability. Terrains, such as jobsites, in which construction vehicles often operate are prone to being uneven. As a construction machine traverses uneven terrain, any instability presented by the holding of mass at a distance from the center of mass is potentially exposed. This exposed instability often results in a bumpy ride where the inertia of the mass of the implement imparts swaying (most prominently vertical swaying, but swaying in all directions is experienced). Such swaying can take portions of the ground-engaging traction device out of contact with the ground.

Accordingly, the concept of ride control was developed. Ride control, when activated, attaches an accumulator to hydraulic lines that impart movement to the lift arms. The attachment of the accumulator provides a "softer" connection between the lift arms and the cab. Thus, when uneven terrain imparts movement on the lift arms, implement, and any payload thereon, movement thereof is dampened by the accumulator and less movement is translated to the cab and the user. Thus, a smoother ride having increased likelihood of keeping the ground-engaging traction device in contact with the ground is provided.

However, as previously mentioned, attaching the accumulator to the hydraulic lines that impart movement to the lift arms provides a "softer" connection having reduced stiffness. When the implement is being used, such as when a bucket is being driven into a pile of dirt, stiffness is desired. A softer connection allows arm and implement deflection and reduces penetration into the pile. Accordingly, the effects of ride control are not desired for all times.

To this end, ride control is provided as a feature that can be turned on or off. Some implementations have placed the ride control switch outside of the cab such that a user has to exit the vehicle to turn it on or off.

It would be beneficial to provide a construction machine or vehicle having an improved mechanism for activating and deactivating ride control, such that the operator could more readily activate and deactivate ride control. It would be of further benefit if such mechanism also allowed the operator to activate and deactivate ride control while the vehicle is in motion.

SUMMARY

According to one exemplary embodiment of the present disclosure, a construction machine is provided. The construction machine includes a chassis and a ground engaging member (such as a wheel or a track) operable to support and move the chassis over ground. The construction machine further includes a work implement (such as a bucket) coupled to the chassis; a cab mounted on said chassis and having a user seat, and a first controller (such as a joystick) accessible to a user seated in the user seat. The joystick controls at least one of moving the work machine over ground and movement of the bucket. The joystick has a first actuator (such as a trigger button) that is operable to selectively engage ride control functionality.

According to another exemplary embodiment of the present disclosure, a construction machine is provided comprising a chassis, a ground engaging member operable to support and move the chassis over ground; a work implement coupled to said chassis; a cab mounted on said chassis and having a user seat, and a first controller accessible to a user seated in the user seat. The first controller includes a first actuator. The first controller is operable to control operation of the ground engaging member to move the work machine over ground and the first actuator operable to selectively engage ride control functionality.

According to another exemplary embodiment of the present disclosure, a method of selectively engaging ride control on a work machine is provided. The method including receiving input from a button on a joystick control, and selectively engaging ride control functionality based, at least partially, on the received input from the button on the joystick control.

BRIEF DESCRIPTION OF THE DRAWINGS

FIG. 2 is a diagrammatic view of the cab of the skid steer of FIG. 1 according to one embodiment of the present disclosure;

FIG. 2A is a close up of a operation controller of the skid steer cab of FIG. 2 according to one embodiment of the present disclosure;

FIG. 3 is a plan view of a steering wheel according to a second exemplary embodiment of the present disclosure;

FIGS. 5A-C show buttons within the cab of FIG. 2 according to an exemplary embodiment of the present disclosure.

Figure 1:
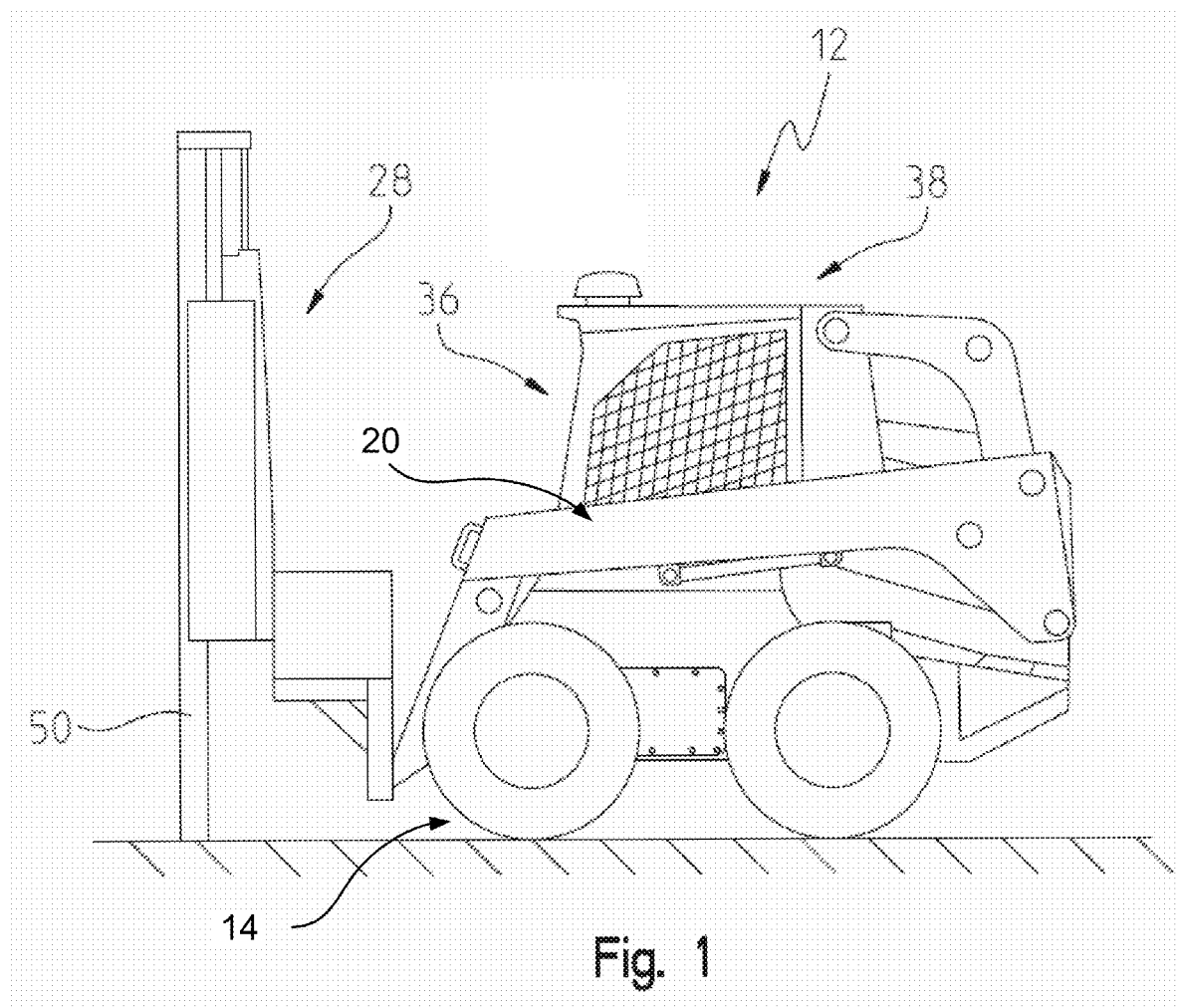
FIG. 1 is a perspective view of a skid steer construction machine according to one embodiment of the present disclosure.

Corresponding reference characters indicate corresponding parts throughout the several views. Although the drawings represent embodiments of the present disclosure, the drawings are not necessarily to scale and certain features may be exaggerated in order to better illustrate and explain the present disclosure. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring first to FIG. 1, construction work machine 12 according to one embodiment of the present invention is illustrated. Construction machine 12 is illustrated as a skid steer. However, it should be understood that the concepts described herein may be adapted for incorporation into any suitable construction, agricultural and forestry equipment including, for example, compact track loaders, backhoes, dozers and other equipment. Construction machine 12 generally includes chassis 38, ground engaging member 14 (a traction device) coupled to chassis 38, construction tool or implement 28 coupled to chassis 38 and cab 36 supported on chassis 38. Ground engaging member 14 is illustrated as a set of wheels, but may be any device capable of moving chassis 38 relative to the ground. For instance, ground engaging member 14 may be in the form of a track drive. Work implement 28 (a construction tool attachment) is operatively coupled to chassis 38 via lift arms 20. Work implement 28 is shown as a post driver operable to drive post 50 into the ground. Other embodiments of work implement 28 are adapted to perform work such as digging, scraping, excavating or hauling in the form of any known tool, such as a broom, auger, grapple or forklift.

Figure 4:
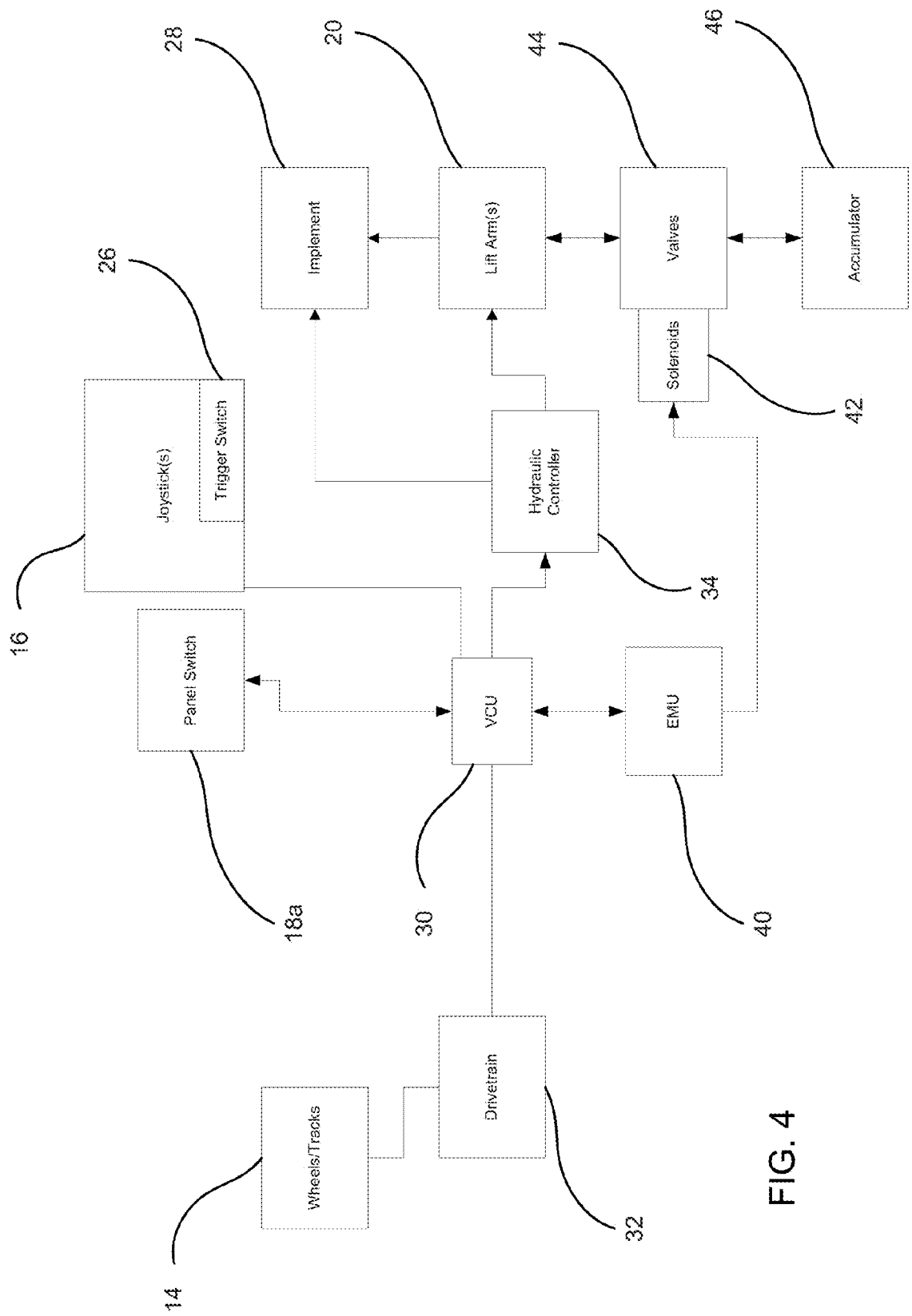
FIG. 4 is a diagram of parts of the skid steer of FIG. 1, according to one embodiment of the present disclosure.

FIG. 4 diagrammatically shows additional portions of machine 12. Vehicle control unit (VCU) 30 coordinates operation of machine 12. VCU 30 is in communication with drivetrain 32, which can include an engine, batteries, and a transmission. Drivetrain 32 controls traction devices 14. VCU 30 is further in communication with hydraulic controller 34 to operate hydraulic pieces, such as lift arms 20 and implement 28. Engagement management unit (EMU) 40 receives commands from VCU 30 to operate solenoids 42 which operate valves 44 as part of the ride control system and functionality. Valves 44 selectively place accumulator 46 in communication with the hydraulic circuits of lift arms 20.

With reference to FIG. 2, cab 36 includes seat 22 supported on chassis 38. Cab 36 further includes switches 18 and operation controllers 16. Switches 18 are shown positioned at the top of cab 36 above the head of a seated user. Embodiments are envisioned where switches are also located at other locations in cab 36.

In the shown example, operation controllers are joysticks 16a,b, shown most clearly in FIG. 2A. General joystick operation of skid steers is known. In one embodiment, joystick operation is conducted via the ISO standard. According to the ISO standard, joystick 16a controls operation of ground engaging members 14 to translate and turn machine 12 over the ground. According to the ISO standard, joystick 16b controls operation of lift arms 20 and implement 28. Pressing forward on joystick 16b lowers lift arms 20 and pulling back raises lift arms 20. Tilting joystick 16b right tilts implement 28 downward and tilting joystick 16b left tilts implement 28 upward. In another embodiment, joystick operation is conducted via an H-pattern standard (or H pattern with foot control). According to the H-pattern, forward and back movement of right joystick 16a controls forward and back movement of right side ground engaging members 14. Similarly, forward and back movement of left joystick 16b controls forward and back movement of left side ground engaging members 14. Left-right movement of one of joystick 16a,b controls up-down movement of lift arms 20 and left-right movement of the other of joysticks 16a,b controls the up-down tilting of implement 28. Thus, it should be appreciated that in the instance of operation according to H-pattern, straight forward driving (or any driving other than spinning in a circle) requires a user to simultaneously operate both joysticks 16a,b.

Joysticks 16a,b have various switches 24a,b, 26 (activators) mounted thereon. The switches can be designated for different things depending on various factors including, but not limited to, the specific implement 28 attached to lift arms 20. In the present disclosure, the functionality of activator 26 (trigger) of joystick 16a is switchable via operation of switch 18a. Switch 18a is more clearly shown in FIGS. 5a-c. Both activators 26 and 18a (discussed below) are illustratively "toggle" type switches (providing for continuous "on" or "off" as opposed to momentary "on" or "off").

FIGS. 5a-c show switch 18a in various states. Switch 18a includes two indicators 52a,b, which are illustratively LED's. FIG. 5a shows switch 18a in a "ride control disabled" state. The "ride control disabled" state is indicated by the lack of illumination of both indicators 52a,b. The state shown in FIG. 5a prevents the activation of ride control functionality. Additionally, the state of FIG. 5a causes operation of trigger 26 to selectively engage the "float" functionality for lift arms 20.

Pressing switch 18a while in the state shown in FIG. 5a causes switch 18a to assume the state shown in FIG. 5b where indicator 52a is illuminated. FIG. 5b shows switch 18a in a "ride control standby" state. The state shown in FIG. 5b allows activation of the ride control functionality. The state shown in FIG. 5b also provides that operation of trigger 26 no longer selectively engages the "float" functionality. The state shown in FIG. 5b provides that operation of trigger 26 selectively engages the "ride control" functionality.

Pressing trigger 26 while in the state shown in FIG. 5b causes activation of the "ride control" functionality. Pressing trigger 26 further causes illumination of indicator 52b of switch 18a. Accordingly, ride control functionality is able to be activated by a press of trigger 26. Furthermore, once switch 18a is pressed to put the system into "ride control standby," ride control functionality is able to be activated without requiring a user to remove his hand from joystick 16a. Similarly, ride control functionality can be deactivated without requiring a user to remove his hand from joystick 16a. When ride control is active, a subsequent push of trigger 26 causes deactivation of ride control and a return to "ride control standby" mode of FIG. 5b. Also, when ride control is active, pressing button 18a returns the system to the "ride control disabled" state of FIG. 5a which deactivates ride control and causes trigger 26 to control engagement of the "float" functionality. Any time that the system is in "ride control disabled" state, activation of switch 18a places the system into "ride control standby" regardless of whether the system was previously switched to "ride control disabled" from the "ride control standby" or the "ride control active" state.

FIG. 3 shows steering wheel 60 according to another embodiment of the present disclosure. Steering wheel 60 includes button 62 thereon. Button 62 selectively engages ride control functionality. Accordingly, while embodiments having joysticks and steering wheels with buttons thereon that selectively engage ride control are shown, embodiments are envisioned where all manner of driving controls and implement controls include actuators thereon that allow engagement of ride control functionality. Button 62 is illustratively a single function button that is exclusively responsible for selectively engaging ride control functionality. However, embodiments are envisioned where the function of button 62 is selected via operation of another button (not shown).

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A construction machine comprising:
   a chassis;
   a ground engaging member operable to support and move the chassis over ground;
   a work implement coupled to said chassis;
   a cab mounted on said chassis and having a user seat;
   a first controller accessible to a user seated in the user seat, the first controller operable to control at least one of operation of the ground engaging member to move the construction machine over ground and operation of the work implement to provide movement of the work implement relative to the chassis, the first controller having a first actuator; and
   a second actuator operable to render the first actuator operable to place a fluid accumulator in fluid communication with the work implement to dampen the transfer of forces from the work implement to the user seat for a ride control functionality.

2. The construction machine of claim 1, wherein the second actuator comprises a first position and a second position, the first position providing that the first actuator is able to selectively engage ride control functionality, the second position preventing the engagement of ride control functionality.

3. The construction machine of claim 2, wherein the second actuator is within reach of a user seated in the user seat.

4. The construction machine of claim 3, wherein the second position of the second actuator corresponds to a disabled state for ride control functionality, and the first position corresponds to enabling standby state and an engagement state of ride control functionality, the first actuator operable to switch between the standby state and the engagement state of ride control functionality.

5. The construction machine of claim 2, wherein the second position causes the first actuator to selectively engage a float functionality of the work implement.

6. The construction machine of claim 1, wherein the first controller is a joystick operable to control operation of the work implement, and the first actuator is disposed on the joystick such that a user is able to selectively engage and disengage ride control functionality via the first actuator without removing the user's hand from the joystick.

7. The construction machine of claim 1, wherein the first actuator is in the form of a trigger button on the first controller.

8. The construction machine of claim 1, further including a second controller that cooperates with the first controller for cooperative control of the at least one of operation of the ground engaging member to move the work machine over ground and operation of the work implement to provide movement of the work implement relative to the chassis.

9. The construction machine of claim 1, wherein the first controller is a joystick operable to control movement of the work implement via the ground engaging member, and the first actuator is disposed on the joystick such that a user is able to selectively engage and disengage ride control functionality via the first actuator without removing the user's hand from the joystick.

10. The construction machine of claim 1, wherein the second actuator is separated from the first controller, the second actuator having a first state and a second state, wherein:
   when the second actuator is in the first state, the first actuator is operable to engage a float functionality of the work implement; and
   when the second actuator is in the second state, the first actuator is operable to places the fluid accumulator in fluid communication with the work implement.

11. A construction machine comprising:
   a chassis;
   a ground engaging member operable to support and move the chassis over ground;
   a work implement coupled to said chassis;
   a fluid accumulator;
   a cab mounted on said chassis and having a user seat;
   a first controller accessible to a user seated in the user seat, the first controller including a first actuator, the first controller operable to control operation of the ground engaging member to move the work machine over ground; and
   a second actuator separate from the first controller, the second actuator operable to render the first actuator operable to selectively engage ride control functionality by placing the fluid accumulator in fluid communication with the work implement.

12. The construction machine of claim 11, wherein the first controller is a joystick.

13. The construction machine of claim 12, wherein the first actuator is a trigger button on the joystick.

14. The construction machine of claim 13, wherein the first actuator is a toggle switch.

15. The construction machine of claim 11, wherein the second actuator is located within the cab and the second actuator is operable to prevent engagement of ride control functionality.

16. The construction machine of claim 15, wherein the first actuator is only able to engage ride control functionality when the second actuator is in a first position.

17. A method of selectively engaging ride control on a work machine, the work machine including a chassis and a work implement coupled to the chassis, the method including:
   receiving an input from a first button on a joystick control;
   receiving an input from a second button separate from the joystick control; and
   selectively engaging ride control functionality by hydraulically coupling a fluid accumulator to the work implement based, at least partially, on the received input from the first button and the second button.

18. The method of claim 17, wherein the first button is a trigger button.

19. The method of claim 17, further including causing the work machine to translate over ground based on movement of the joystick control.

20. The method of claim 19, further including causing movement of the work implement relative to a work machine cab based on movement of the joystick control.

21. The method of claim 17, further including:
   deactivating the ride control functionality; and
   when the ride control functionality is deactivated, selectively engaging a float functionality of the work implement based, at least partially, on the received input from the first button on the joystick control.

* * * * *